United States Patent [19]

Meguro et al.

[11] Patent Number: 4,805,447

[45] Date of Patent: Feb. 21, 1989

[54] DEVICE FOR DETECTING AN ABNORMALITY OF A ROTATION SENSOR

[75] Inventors: Kazuhisa Meguro; Yuichi Ono, both of Toyota, Japan

[73] Assignee: Toyota Jidosha Kabushiki Kaisha, Toyota, Japan

[21] Appl. No.: 200,415

[22] Filed: May 31, 1988

[30] Foreign Application Priority Data

Jun. 2, 1987 [JP] Japan ............................ 62-138763

[51] Int. Cl.$^4$ ............................................. G01L 5/28
[52] U.S. Cl. ........................................ 73/121; 303/92
[58] Field of Search .............. 73/121, 127; 364/426, 364/565, 566; 303/92; 188/1.11

[56] References Cited

U.S. PATENT DOCUMENTS

| | | | |
|---|---|---|---|
| 4,092,853 | 6/1978 | Schneider et al. | 73/121 |
| 4,106,820 | 8/1978 | Ruhnau et al. | 303/92 |
| 4,361,871 | 11/1982 | Miller et al. | 364/426 |
| 4,722,576 | 2/1988 | Matsuda | 303/92 |

FOREIGN PATENT DOCUMENTS 58-61052  4/1983  Japan .
61-193961 8/1986  Japan .

OTHER PUBLICATIONS

English Abstract of Japanese Patent No. 58-61052(A).
New Model Technical Manual of Toyota Supra, pp. 4-92 thru 4-97, Feb. 1986.

*Primary Examiner*—Jerry W. Myracle
*Attorney, Agent, or Firm*—Cushman, Darby & Cushman

[57] ABSTRACT

An abnormality detecting device for detecting a breakage in wiring of a rotation sensor. When the rotating acceleration calculated based on signals from the rotation sensor is greater than a predetermined acceleration value and the rotating speed calculated based on signals from the rotation sensor is zero, a detection signal is put on a wire connected to the rotation sensor. A change in the level of the detection signal is checked for determining whether the rotation sensor is abnormal, i.e., whether there is a breakage in the rotation sensor.

6 Claims, 6 Drawing Sheets

WHEN WIRE BREAKS

NO WIRE BREAKAGE

DEVICE FOR DETECTING AN ABNORMALITY OF A ROTATION SENSOR

BACKGROUND OF THE INVENTION

This invention relates to a rotation sensor of a rotating body such as a wheel of a vehicle, and specifically to an abnormality detecting device for detecting a breakage of wiring of the rotation sensor.

When a vehicle running at high speed undergoes a strong emergency braking, the wheels are locked and a skid occurs between the wheels and the road surface because there is a limit in the friction between the tire and the road surface. In order to prevent the skid, an anti-skid control is already known in which the braking force is controlled to keep the slippage (slip ratio) between the tire and the road surface at a predetermined adequate value.

During anti-skid control, rotation speed and rotation acceleration of the wheel must be accurately monitored, and for detecting the rotation speed, a rotation sensor is provided for the wheel. The rotation sensor includes a hub rotor and an electromagnetic pick-up. The hub rotor rotates with the wheel and has many projections arranged on its periphery. The pick-up, on the other hand, is fixed to the vehicle body in close proximity to the hub rotor and senses an access of each of the projections with a coil and a permanent magnet. With each access of the projection to the coil due to the rotation of the wheel, the magnetic field around the coil is altered to generate a voltage signal at the coil. By counting the number of voltage signals generated with respect to time, the rotation speed of the wheel is detected.

One of the possible abnormalities of such a rotation sensor is a breakage of the wiring of the coil or its neighbors. For detecting such breakage, a method is already known, in which a detection signal of a preset voltage height is sent to the rotation sensor and a change in the detection signal is checked when the ignition key switch is turned on at the time of engine start-up.

However, abnormality of the rotation sensor in the course of the anti-skid control is not detected by checking the breakage only at the time of engine start-up. Thus, if the breakage occurs when the vehicle is running, the rotation speed of the wheel is sensed as 0 because the rotation sensor will not generate the voltage signal. This leads to an incorrect judgment that the wheel is locked and causes a release of the brake by the anti-skid control system, which contravenes the intention of the driver.

SUMMARY OF THE INVENTION

An object of the invention, therefore, is to detect an abnormality of the rotation sensor, especially a breakage in a wire of the rotation sensor when the sensing object is rotating.

Another object is to prevent a malfunctioning of the anti-skid control by adequately finding the abnormality of the rotation sensor.

In order to achieve these and other objects, the abnormality detection device of the invention is provided, as shown in FIG. 1, for a rotation sensor M2 which generates an electrical signal based on rotation of a rotating body M1 and includes: calculation means M3 responsive to the electrical signal from the rotation sensor for calculating a rotating speed and a rotating acceleration of the rotating body M1; determination means M4 for generating a determination signal when the calculated rotating acceleration is greater than a predetermined value and the calculated rotating speed is zero; detection signal generation means M5 responsive to the determination signal for generating a detection signal and inputting the detection signal into the rotation sensor M2, the rotation sensor M2 generating a return signal in response thereto; and abnormality determination means M6 for detecting a change in the return signal and for determining that the rotation sensor M2 is abnormal based on the change.

DETAILED DESCRIPTION OF THE PREFERRED EMBODIMENT

Figure 1:
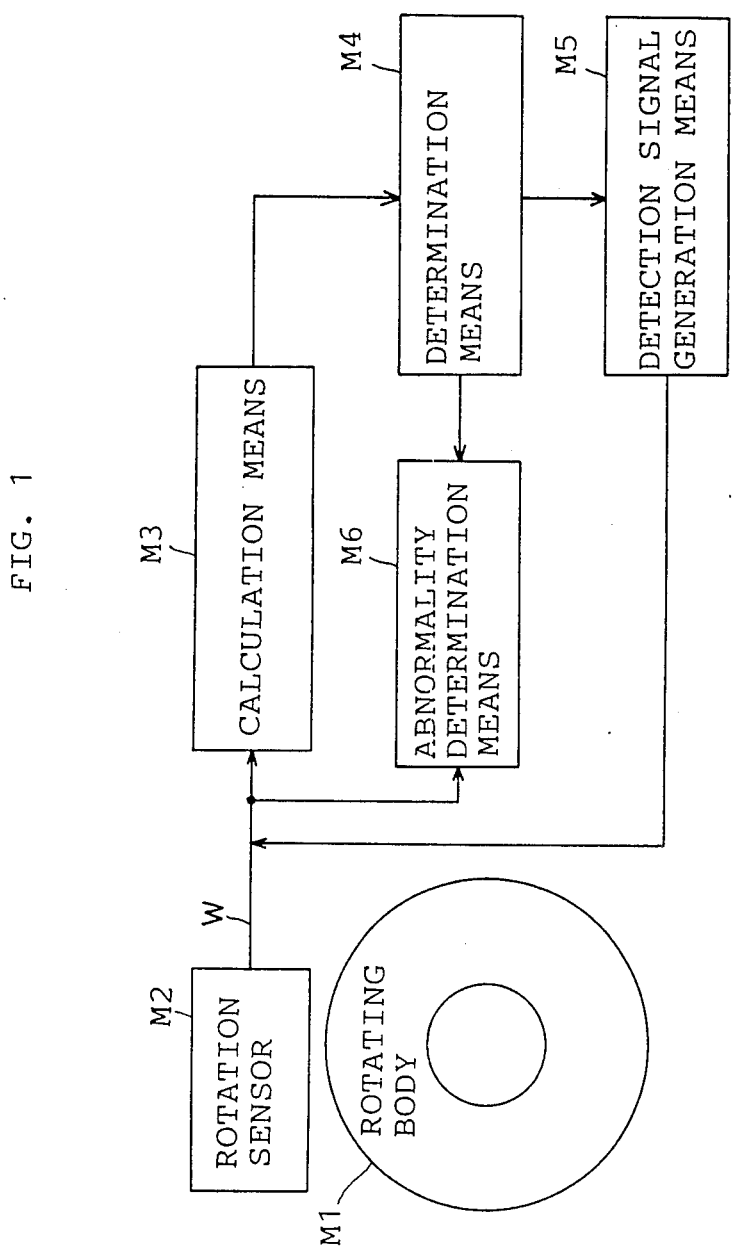
FIG. 1 is a block diagram for explaining the construction of the invention.
Figure 2:
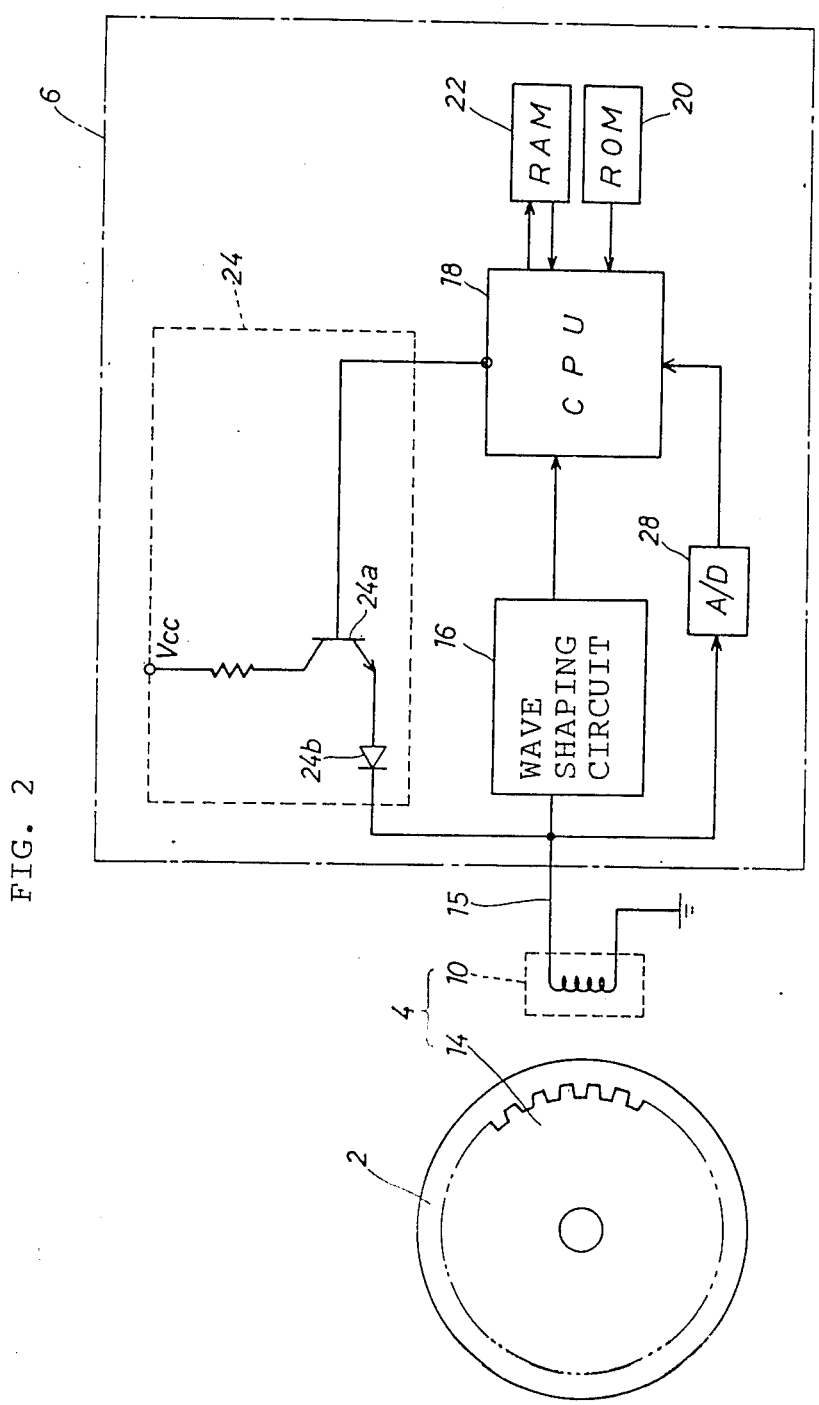
FIG. 2 is a circuit block diagram of an abnormality detection device of a rotation sensor in accordance with an embodiment of the invention.

The invention can be better understood by the following detailed explanation of an abnormality detection device in accordance with the embodiment of FIG. 2.

Figure 3A:
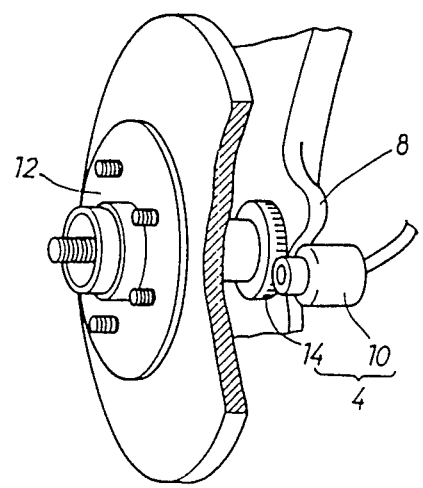
FIG. 3A is a cut-away view of a wheel of a vehicle showing the point where the rotation sensor is attached.
Figure 3B:
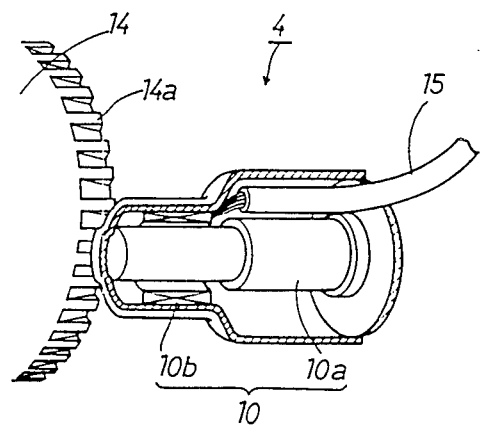
FIG. 3B is a more detailed view of the rotation sensor.

In the abnormality detection device of FIG. 2, a rotation sensor 4 is provided for a wheel 2 and is controlled by an electronic control unit (ECU) 6. As shown in FIGS. 3A and 3B, the rotation sensor 4 is composed of an electromagnetic pick-up 10 attached on a steering knuckle 8 and a hub rotor 14 attached to an axle hub 12 which rotates with the wheel 2. The hub rotor 14 has many projections 14a on its periphery. The pick-up 10 has a permanent magnet 10a and a coil 10b and a wire 15 which connects the coil 10b and the ECU 6.

Referring back to FIG. 2, ECU 6 includes: a wave shaping circuit 16 for converting a signal from the rotation sensor 4 into a well shaped pulse signal; a known CPU 18 responsive to the pulse from the wave shaping circuit 16 for calculating the rotating speed and rotation acceleration of the wheel 2 and for determining an abnormality of the rotation sensor 4; a ROM 20 which stores predetermined control programs and various initial data; a RAM 22 for temporarily storing data; a detection signal generating circuit 24; and an A/D converter 28. The detection signal generating circuit 24 includes a transistor 24a and a diode 24a which are responsive to an output signal from the CPU 18 so as to generate a rectangular pulse signal having voltage height Vcc for use in diagnosing the state of the rotation sensor 4 and placing the pulse signal on the wire 15. The A/D converter 28 inputs the return signal from the wire 15 and converts it into a digital signal for processing by CPU 18.

Figure 4A:
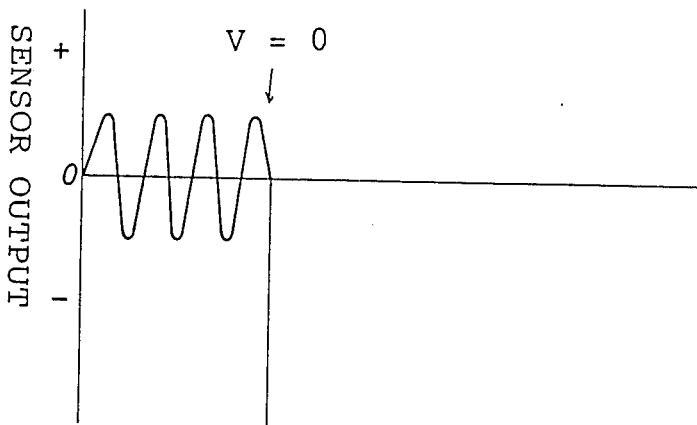
FIGS. 4A to 4E are graphs showing the change in sensor output (4A), the detection signal (4B), the return signal (4C), the breakage determination (4D) and the return signal (4E) with respect to time.

The output signal of the rotation sensor 4 is represented by, as shown in FIG. 4A, a sinusoidal curve. This output signal is converted by the wave shaping circuit 16 into pulse signals, and the number of pulse signals for a predetermined interval of time is counted to detect the rotating speed V and rotating acceleration AV of the wheel. The rotating speed V is derived by counting the number $N_1$ of pulse signals generated within a preset time period $T_1$. The rotating speed V is thus calculated as:

$$V = K_1 \cdot N_1 / T_1$$

where $K_1$ is an appropriate coefficient. The rotating acceleration AV, on the other hand, is derived by counting pulse numbers $N_1, N_2, \ldots, N_n$ for the time period $T_1$ and calculating the neighboring differences $\Delta AV_1 = N_2 - N_1$, $\Delta AV_2 = N_3 - N_2$, ..., $\Delta AV_n = N_{n+1} - N_n$. The rotating acceleration AV is thus given by multiplying the differences $\Delta AV_1$, $\Delta AV_2, \ldots, \Delta AV_n$ by an appropriate coefficient $K_2$.

Figure 5:
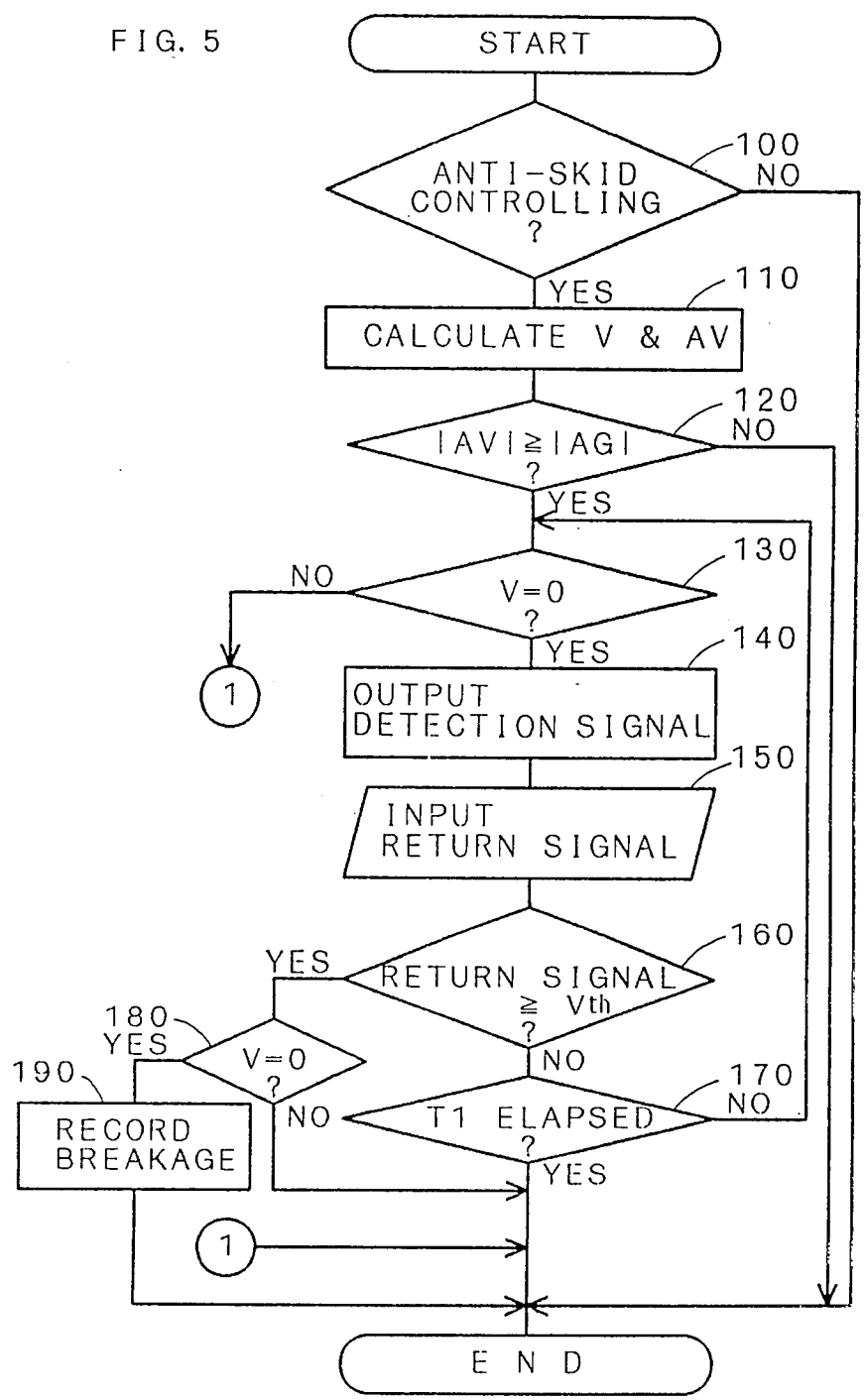
FIG. 5 is a flowchart of an abnormality detection processing executed in the embodiment of FIG. 2.

The abnormality detection processing executed by ECU 6 will now be explained with reference to the flowchart of FIG. 5.

Figure 4B:
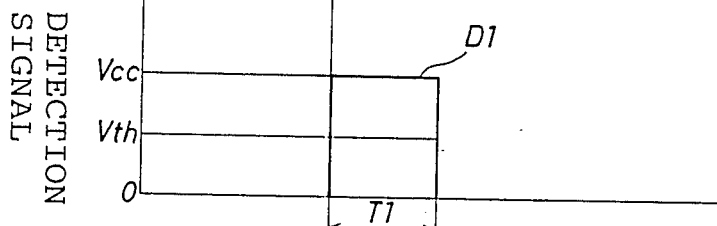
Figure 6A:
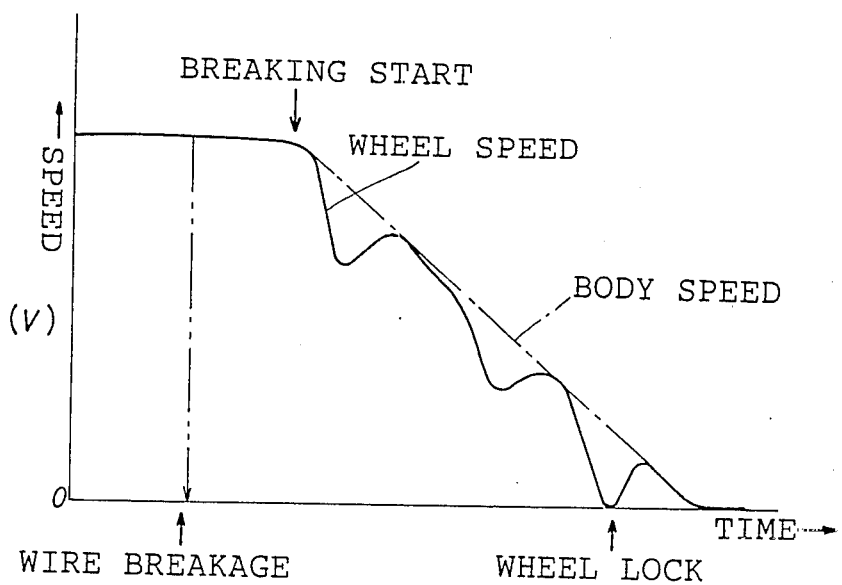
FIGS. 6A and 6B are graphs showing a change in wheel speed and vehicle body speed (6A) and wheel acceleration (6B) when a wire breakage occurs.
Figure 6B:
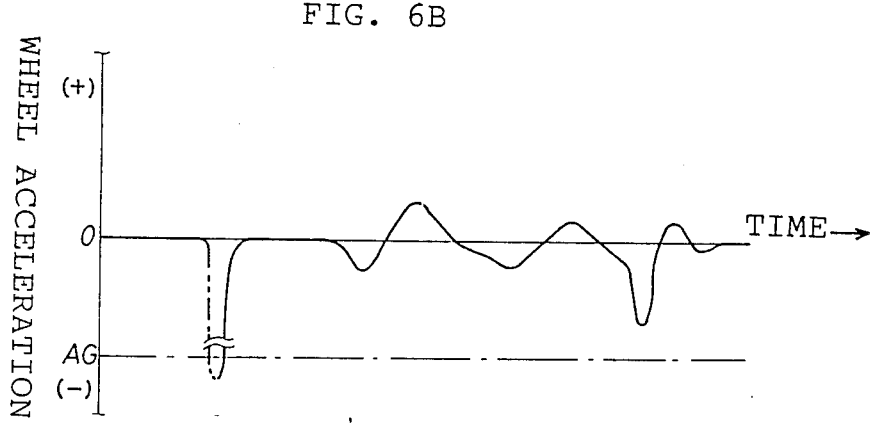

This routine is repeatedly executed at a preset time interval. First at step 100, it is determined whether the anti-skid control is being executed. If the anti-skid control is not being executed, the routine ends. When the anti-skid control is being executed, on the other hand, the rotating speed V and the rotating acceleration AV are calculated based on the number of pulses from the wave shaping circuit 16 at step 110. Then, at step 120 it is determined whether the absolute value |AV| of the calculated acceleration AV is greater than a preset reference value |AG|. This step is executed because, when the wire breaks, the detected acceleration AV becomes much greater than the acceleration which normally develops during braking or at the time of wheel lock, as shown in FIGS. 6A and 6B. If the determination result is no, the routine ends. However, when the absolute acceleration |AV| is greater than |AG|, it is further determined at step 130 whether the wheel rotating speed V is zero. This step is executed because the rotating speed V becomes 0 when the wire breaks. Thus, if the determination result is no, the routine ends. However, if the rotating speed is 0, at step 140 the CPU 18 outputs a signal to the detection signal generating circuit 24 instructing it to generate a detection signal as a rectangular pulse D1 having voltage height Vcc, as shown in FIG. 4B. The detection signal D1 then is sent to the rotation sensor 4 via the wire 15.

Figure 4C:
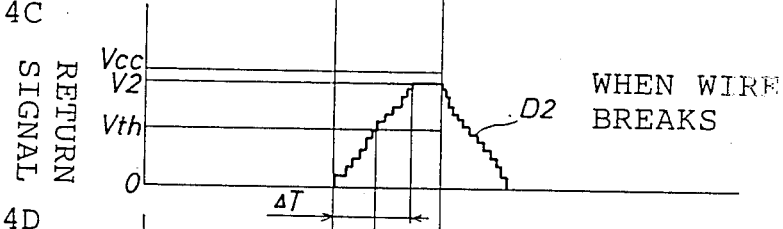
Figure 4D:
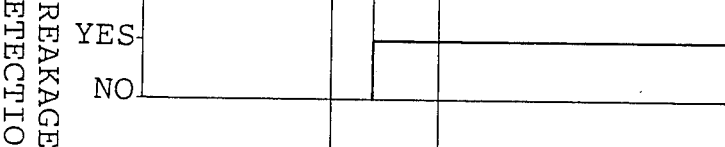
Figure 4E:
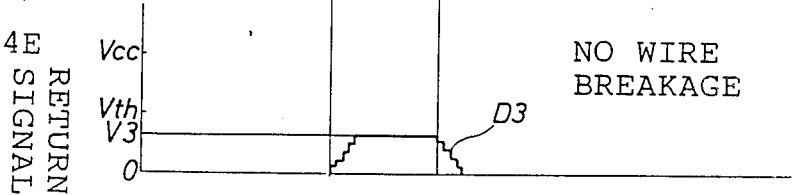

Then at step 150, a return signal issued from the rotation sensor 4 in response to the detection signal D1 is input via the A/D converter 28 into the CPU 18. The return signal indicates whether or not there has been a breakage in the wiring. Return signals D2 and D3 for the respective cases of breakage or no breakage are shown in FIGS. 4C and 4E. At the subsequent step 160, it is then determined whether the height V2 or V3 corresponding to the return signals D2 or D3 is higher than a preset threshold value Vth. This step tentatively determines the abnormality or breakage of the rotation sensor 4.

When there is a breakage in the rotation sensor 4, the return signal D2 has a higher voltage than the threshold value Vth. When there is no breakage in the rotation sensor 4, however, the return signal D3 has a lower voltage than the threshold value Vth because one end of the rotation sensor 4 is connected to ground. By comparing the voltage height of the return signal D2 or D3 with the threshold value Vth, the abnormality determination of the rotation sensor 4 can be achieved, as shown FIG. 4D.

When the voltage height of the return signal is less than Vth, it is determined at step 170 whether a preset time interval $T_1$ has elapsed since the detection signal D1 was generated. This step is executed because there is a delay time $\Delta T$, as shown in FIGS. 4C and 4E, in the data conversion at the A/D converter 28. Because of this conversion delay, the shape of the return signal D2 or D3 is deformed from that of the rectangular detection signal D1, as shown in FIGS. 4C and 4E. When there is a breakage, the height of the return signal D2 exceeds the threshold value Vth within the preset time interval $T_1$ and control proceeds back to step 130. However, if the height of the return signal does not exceed the threshold value Vth after the time interval $T_1$, it is assumed that there is no breakage in the rotation sensor 4 and the routine ends.

When the height of the return signal is determined to be greater than the threshold value Vth at step 160, it is further determined at step 180 whether the rotating speed V of the wheel is zero. This step is executed in consideration of the conversion delay time $\Delta T$ of the A/D conversion circuit 28, for if the output of the rotation sensor 4 recovers in this delay time $\Delta T$, the rotation sensor 4 is mistakenly determined as being abnormal without this confirmation step 180. When the breakage in the rotation sensor 4 is confirmed at step 180, necessary actions to cope with the abnormality are taken, e.g., the abnormality or breakage is recorded at step 190 in an appropriate memory and the use of the output signal from the rotation sensor 4 for calculating the rotating speed V of the wheel in the anti-skid control is prohibited.

As described above, in the disclosed embodiment, when the absolute value of the rotating acceleration AV is greater than a preset reference value |AG| and the rotating speed V is zero, it is suspected that there is a wire breakage in the rotation sensor 4 and the detecting signal D1 is put on the wire 15 connected to the rotation sensor 4. The voltage height of the return signal from the rotation sensor 4 then is compared with the threshold value Vth. When the height is greater than Vth, it is assumed that there is a breakage in the rotation sensor 4 and further, in order to confirm the breakage, the rotation speed V is again checked to determine whether or not it is zero. Therefore, when the output signal from the rotation sensor 4 indicates a zero rotation speed, it can be accurately determined whether or not it has been caused by a breakage in the sensor 4, thereby assuring an adequate anti-skid control.

Although the above embodiment relates only to anti-skid control, this invention is also applicable to traction control. In addition, the rotating body to which the rotation sensor is applied is not limited to the wheel but may be any other rotating body, e.g., the crank shaft of the engine can be utilized.

Obviously, many modifications and variations of the present invention are possible in view of the above teachings. It is therefore to be understood that within the scope of the appended claims, the invention may be practiced otherwise than as specifically described.

What is claimed is:

1. An abnormality detection device for a rotation sensor which generates an electrical signal based on rotation of a rotating body, comprising:

calculation means responsive to the electrical signal from said rotation sensor for calculating a rotating speed and a rotating acceleration of the rotating body;

determination means for generating a determination signal when the calculated rotating acceleration is greater than a predetermined value and the calculated rotating speed is zero;

detection signal generation means responsive to the determination signal for generating a detection signal and inputting said detection signal into the rotation sensor, said rotation sensor generating a return signal in response thereto; and abnormality determination means for detecting a change in the return signal and for determining that the rotation sensor is abnormal based on the change.

2. The abnormality detection device according to claim 1, wherein the predetermined value utilized in the determination means is a value greater than the rotating acceleration values reached by the rotating body during normal operation of the rotating body.

3. The abnormality detection device according to claim 2, wherein:

the rotation sensor comprises a coil which generates said electrical signal;

the detection signal generation means generates a first pulse signal D1 having a voltage height of a preset value, said first pulse signal being connected to the coil as said detection signal; and the abnormality determination means comprises a pulse detection section for detecting said return signal generated by said rotation sensor in response to the first pulse signal D1 and an abnormality determination section for determining that the rotation sensor is abnormal when a voltage height of the detected return signal is higher than a preset voltage threshold.

4. The abnormality detection device according to claim 3, wherein the pulse detection section comprises an A/D converter for digitizing said return signal.

5. The abnormality detection device according to claim 4, wherein the abnormality determination section determines that the rotation sensor is abnormal when the voltage height of the return signal is higher than said preset voltage threshold and the calculated rotation speed is still zero.

6. The abnormality detection device according to claim 1, wherein said rotation sensor is responsive to an anti-skid controller for controlling rotation of a vehicle wheel during braking in accordance with said abnormality determination.

* * * * *